United States Patent
Inami et al.

(12) 
(10) Patent No.: US 6,336,328 B1
(45) Date of Patent: Jan. 8, 2002

(54) MASTER CYLINDER FOR BRAKING AND A MOTORCYCLE INCLUDING A MASTER CYLINDER

(75) Inventors: Shigeto Inami; Kazuhiko Gogo, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/518,090

(22) Filed: Mar. 3, 2000

(30) Foreign Application Priority Data

Mar. 5, 1999 (JP) .............................. 11-058369

(51) Int. Cl.[7] .............................. B60T 11/26; F15B 7/08
(52) U.S. Cl. .............................. 60/585
(58) Field of Search ............................ 60/585; 180/218, 180/315

(56) References Cited

U.S. PATENT DOCUMENTS 4,924,673 A * 5/1990 Barker et. al. ............... 60/585

FOREIGN PATENT DOCUMENTS

| GB | 500606 | * | 2/1939 | ............... 60/585 |
| GB | 1120068 | * | 7/1968 | ............... 60/585 |
| JP | 17167 | * | 2/1977 | ............... 60/585 |
| JP | 63258285 | | 10/1988 | |
| JP | U3-2962 | | 1/1991 | |
| JP | A10-236374 | | 9/1998 | |

* cited by examiner

*Primary Examiner*—F. Daniel Lopez (57) ABSTRACT

A brake master cylinder and a motorcycle including the brake master cylinder. The master cylinder has a main body and a sub-tank extending parallel to the main body. The master cylinder is arranged on the motorcycle to be generally perpendicular to the road surface, and the sub-tank is aligned with an axis of the main body. The main body and the sub-tank are integral and the sub-tank is disposed outwardly from the vehicle with respect to the axis of the main body. The resultant shape of the master cylinder is an elongated body which does not add to the width of the vehicle, and uses minimal space. The main body includes a mounting seat for mounting a brake hose, the mounting seat being arranged on the main body so as to extend perpendicularly to the axis of the main body.

11 Claims, 7 Drawing Sheets

MASTER CYLINDER FOR BRAKING AND A MOTORCYCLE INCLUDING A MASTER CYLINDER

BACKGROUND OF THE INVENTION

1. Field of the Invention

The present invention relates to a master cylinder for braking and a motorcycle on which the master cylinder for braking is mounted. In particular, the present invention relates to a master cylinder for braking in which a sub-tank for supplying working oil for braking is integrally provided on a master cylinder main body, and which is disposed with its major axis directed substantially in the vertical direction, and a motorcycle on which the master cylinder for braking is mounted.

2. Background Art

A master cylinder is known as a means for generating hydraulic pressure to be applied to a front brake. Conventional master cylinders are configured with a sub-tank for supplying working oil for braking provided on a master cylinder main body, with the major axis of the master cylinder main body being substantially parallel to the ground. A master cylinder of this type is disclosed in Japanese Utility Model Laid-open No Hei 3-2962, and Japanese Patent Laid-open No. Hei 10-236374.

In this type of master cylinder, a plurality of ports in a partition wall which partitions the sub-tank from the master cylinder main body are formed using a tool passing through the working oil supply port. A lid for blocking the working oil supply port is provided substantially in parallel to the major axis of the master cylinder main body Taking into account the supply of working oil upon maintenance, the lid must be disposed substantially in parallel to the round, and therefore, the major axis ot the master cylinder main body must be substantially parallel to the ground. In this case, it is difficult to ensure a space for disposing and mounting the master cylinder in a finished vehicle.

If the major axis of the master cylinder for braking is arranged substantially perpendicular to the ground to ensure mounting space for the master cylinder, a sub-tank for supplying working oil for braking must be provided separately from the master cylinder main body. In addition, a rubber brake hose is required to connect the sub-tank to the master cylinder main body. This configuration is shown in Japanese Patent Laid-open No. Sho 63-258285.

However, it is difficult to ensure a space for mounting the separate sub-tank and a space for allowing the brake hose to pass therethrough Further, since the sub-tank and the brake hose must be fixed by stays and bolts, the number of parts is increased.

An object of the present invention is to solve the above-described problems in conventional master cylinders for braking, and to provide a master cylinder for braking in which a sub-tank for supplying working oil for braking is integrally provided on a master cylinder main body.

It is an additional object of the invention to provide a master cylinder of reduced size which is disposed so that its major axis extends substantially in the vertical direction.

It is a further object of the present invention to provide a master cylinder of simplified structure which reduces space used in a motorcycle, allowing for a narrower motorcycle body.

It is still a further object of the present invention to provide a motorcycle on which a master cylinder having the above-mentioned characteristics is mounted

SUMMARY OF THE INVENTION

To achieve the above objects and other advantages, a master cylinder for braking is provided with a master cylinder main body and a sub-tank for supplying working oil for braking. The sub-tank is integrated with the master cylinder main body, and has an elongated shape. The sub-tank's major axis is substantially parallel to the major axis of the master cylinder main body.

The master cylinder in which the sub-tank for supplying working oil for braking is integrally provided on the master cylinder main body is formed therefore has an elongated shape. As a result, the master cylinder for braking has a reduced width This makes it possible to simplify the structure of the master cylinder to slim the appearance of the master cylinder, and to save space in the brake system.

A mounting seat for mounting a brake hose is formed at one end in the major axis direction of the master cylinder main body so as to extend perpendicularly to the major axis of the master cylinder main body. A mounting portion of the brake hose is fastened to the mounting seat, and one end of the sub-tank extends upwardly from the mounting seat of the brake hose, and has a port for supplying working oil for braking.

As a result, the structure of the connecting portion of the brake hose to the master cylinder main body is reduced in size and simplified. Further, since the brake hose is rotatable around the major axis of the master cylinder main body, the degree of freedom in layout of the other peripheral parts can be improved. For example, upon supply of working oil for braking, the mounting portion of the brake hose does not obstruct maintenance work.

The inner side of the sub-tank has a cylindrical shape, and a bag-like diaphragm and an oil separator are disposed in the sub-tank. The inside of the diaphragm communicates with atmospheric air for expansion and contraction As a result, upon initial braking operation of the disk type brake system, a part of the working oil is pressed back in the sub-tank. The pressing action due to the working oil thus pressed back is absorbed by contraction of the diaphragm, so that the initial braking operation of the brake system can be moderated. This prevents sudden braking and adds to the safety of the brake system.

Further, during running of the vehicle, the working oil in the sub-tank intakes air due to vibration and bubbles These bubbles entrapped in the working oil are separated from and blocked by the oil separator.

As a result, the bubbles in the working oil do not enter the cylinder chamber of the master cylinder. This improves the reliability of the master cylinder The oil separator is integrally provided on the diaphragm, and is easily mounted, reducing the number of parts.

The master cylinder for braking is disposed on a side of a vehicle body so that the major axis of the master cylinder main body extends substantially in the vertical direction of the vehicle body.

As a result, the length of the vehicle body can be shortened. Even if an external force is applied to the master cylinder due to upsetting or the like, the moment applied to the mounting portion of the master cylinder can be reduced. This makes it possible to reduce the weight of the stays, etc. at the mounting portion of the master cylinder. Further, since the master cylinder does not have a large width, the motorcycle appears slim.

The master cylinder for braking is disposed so that the major axis of the sub-tank is positioned outwardly from the major axis of the master cylinder.

As a result, if the master cylinder for braking is used as the master cylinder for operating the rear brake, the width of the swing arm can be made wider toward the rear side of the vehicle body, so that a wide tire can be mounted without widening the pivot width. The pivot width is the transverse distance of the portion at which the right and left pivot plates are disposed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
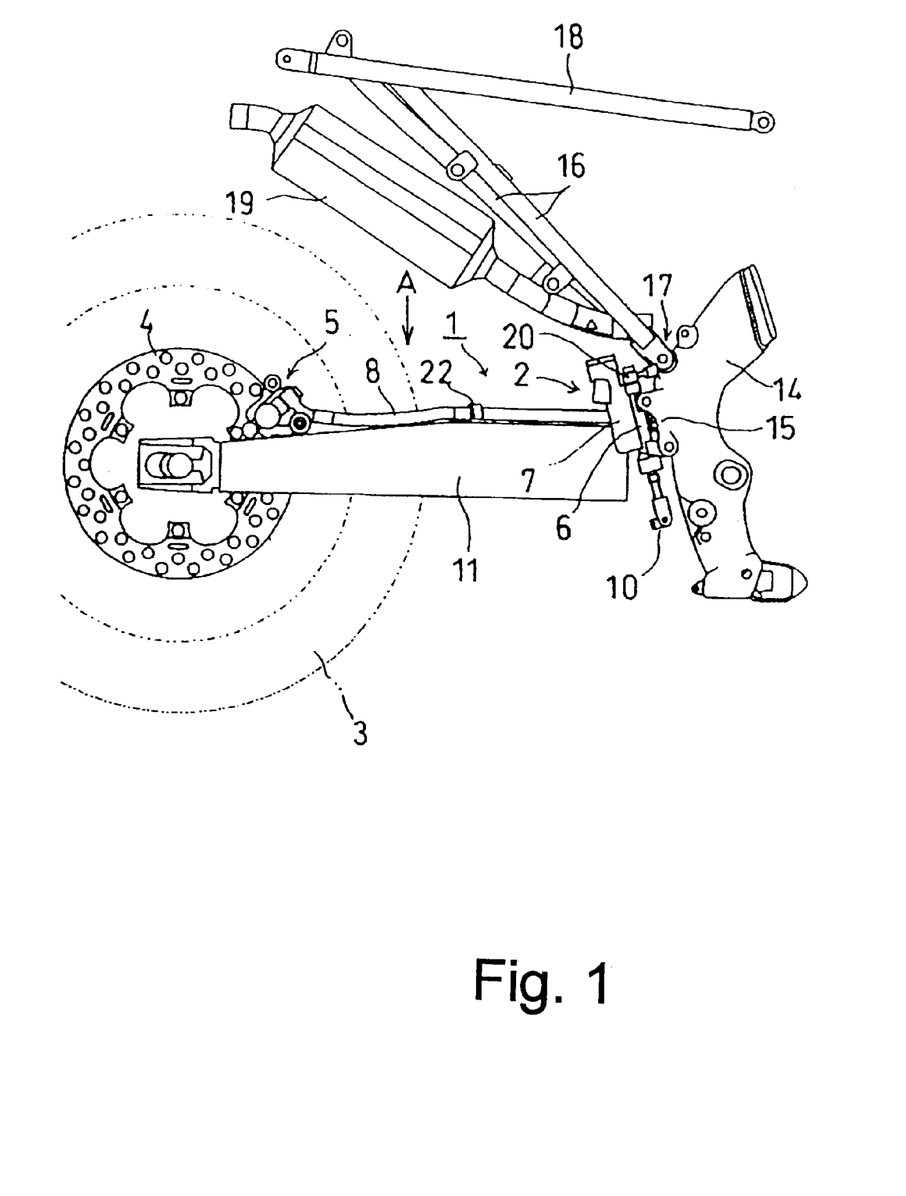
FIG. 1 is a right outer side view of a disk type brake system having a master cylinder according to an embodiment of the present invention.
Figure 2:
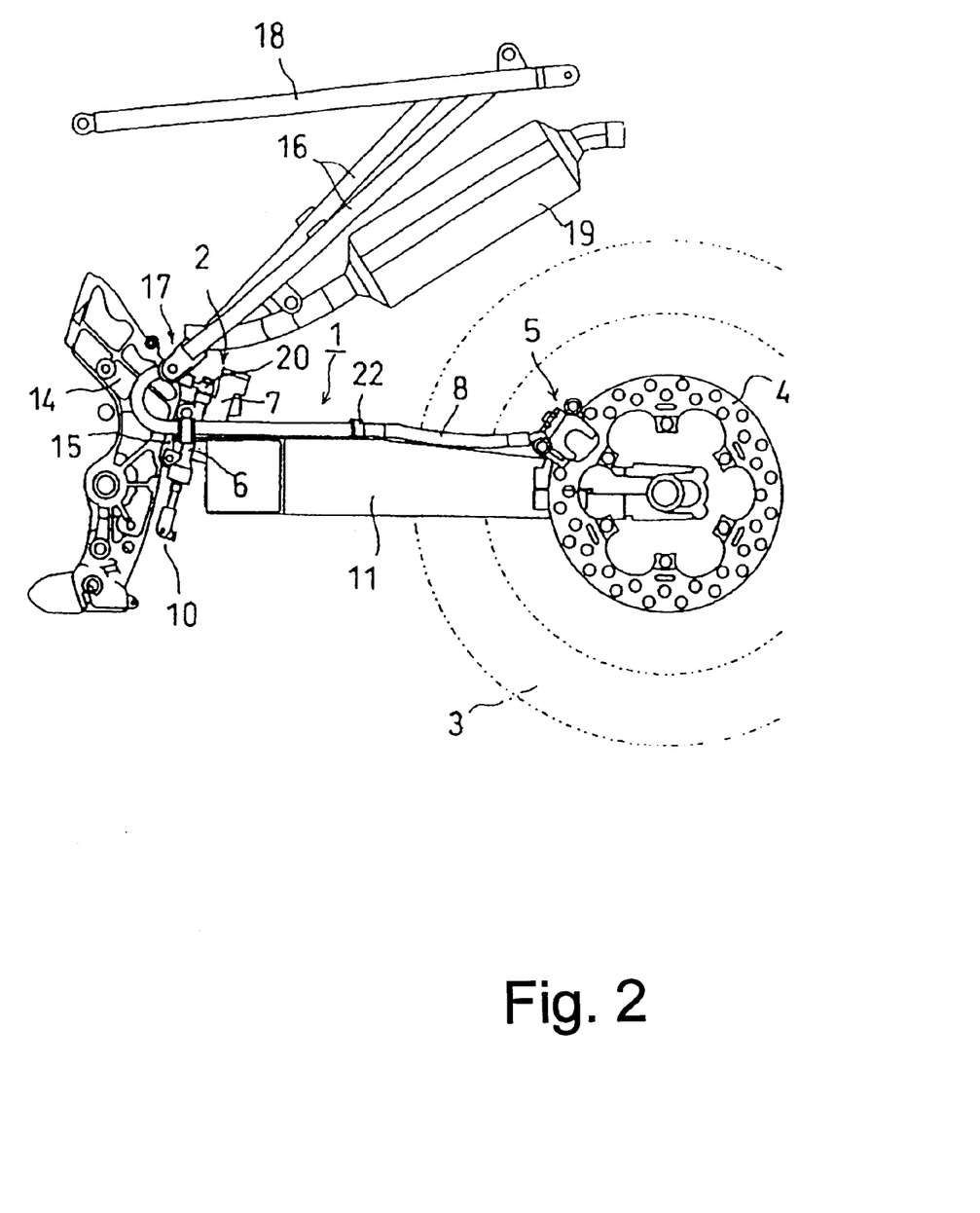
FIG. 2 is a left inner side view, seen from the opposed side, of the mounting structure shown in FIG. 1.
Figure 3:
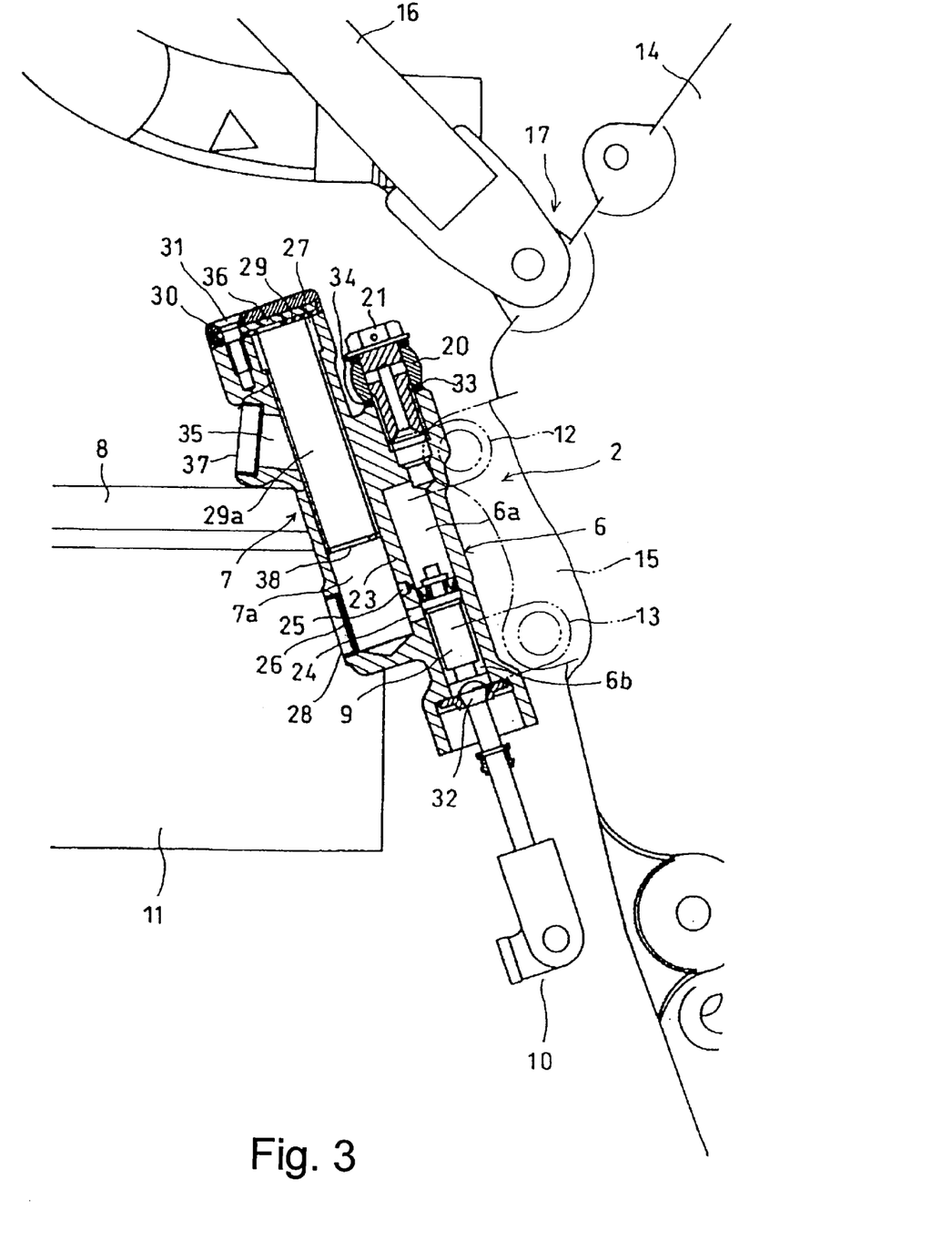
FIG. 3 is an enlarged sectional view of the master cylinder.

Referring to FIGS. 1 to 3, a disk type brake system 1 to which a master cylinder 2 for braking according to this embodiment is applied includes a brake disk 4 integrally joined to an axle of a rear wheel 3 of a motorcycle. A caliper 5 having a pair of friction pads (not shown) act to clamp both side surfaces of the brake disk 4, and a master cylinder main body 6 generates a working hydraulic pressure applied to the pair of friction pads via a piston (not shown). For the purpose of describing the present invention, the term "vertical" and variations thereof will indicate a direction generally perpendicular to a surface on which the motorcycle is supported.

A sub-tank 7 supplies a working oil for braking, and is integrally provided on the master cylinder main body 6. A brake hose 8 connects the caliper 5 to the master cylinder main body 6 for introducing the working oil from the master cylinder main body 6 to the caliper 5. A link mechanism 10 includes a brake pedal (not shown) and is linked to the piston 9 in the master cylinder main body 6. While not shown in detail, the caliper 5 is rigidly mounted on the rear end of a swing arm 11 with a bolt The master cylinder 2 is composed of the master cylinder main body 6 and the sub-tank 7. The master cylinder main body 6 is rigidly mounted on a pivot plate 14 by connecting two stays 12 and 13 (see FIG. 3) provided on the master cylinder main body 6 to a bracket 15 provided on the pivot plate 14 Bolts pass through two bolt holes formed in the bracket 15 to secure the stays 12 and 13 to the bracket 15.

As shown in FIG. 1, the pivot plate 14 is has an asymmetric V-shape when viewed from the side. The central portion of a body frame of the motorcycle, an upper half (not shown) of a main frame extending rightwardly (forwardly of the vehicle), obliquely upwardly is integrally connected to the upper end of the pivot plate 14, and the lower end of a lower rear frame 16 as part of a rear frame extending leftwardly (rearwardly of the vehicle), obliquely upwardly is bolted to a bolt connection portion 17 provided on the asymmetric V-shaped portion of the pivot plate 14.

The body frame structure is substantially symmetric in the vehicle body transverse direction. Reference numeral 18 designates an upper rear frame, and 19 designates an exhaust muffler.

An end portion, on the master cylinder main body 6 side, of the brake hose 8 includes an eye fixture 20. The brake hose 8 is mounted to the master cylinder main body 6 by fastening the eye fixture 20 to a mounting seat 33 provided at one end of the master cylinder main body 6 by means of a banjo-type bolt 21. The mounting portion of the brake hose 8 includes the eye fixture 20 and the banjo-type bolt 21.

The mounting seat 33 extends in a direction perpendicular to the major axis of the master cylinder main body 6. Oil seals 34 are interposed between the eye fixture 20 and the mounting seat 33, and between the eye fixture 20 and the head of the banjo-type bolt 21.

The axial line of the banjo-type bolt 21 is offset from the axis of a cylinder chamber 6a of the master cylinder main body 6. It is therefore possible to ensure a space for containing the mounting portion of the brake hose 8 and to facilitate fastening of the banjo-type bolt 21.

In this way, the end portion of the brake hose 8 is mounted to the master cylinder main body 6 for fluid communication with the cylinder chamber 6a of the master cylinder main body 6 via an inner passage of the eye fixture 20 and an inner passage of the banjo-bolt 21. The brake hose 8 is mounted to the main body 6 such that the mounting angle around the major axis of the master cylinder main body 6 is adjustable.

As shown in FIG. 2, the brake hose 8 extends from the connection portion of the master cylinder main body 6, turning from outside to inside the bolt connection portion 17 at the lower end of the lower rear frame 16. The brake hose 8 extends rearwardly along the upper end surface of the swing arm 11. The end portion of the brake hose 8, on the caliper 5 side, is connected to the caliper 5.

The brake hose 8 is fixed to the upper end surface of the swing arm 11 at a plurality of points by fasteners 22. When the swing arm 11 is swung in the vertical direction, the brake hose 8 can follow the vertical swing action of the swing arm 11 because the curved portion of the brake hose 8, which turns from outside to inside of the bolt connection portion 17 at the lower end of the lower rear frame 16, is deformed in accordance with the vertical swing action of the swing arm 11.

FIG. 3 shows the detailed structure of the master cylinder 2. The master cylinder 2 for braking is mounted, via the pivot plate 14, on the right side of the body frame of the motorcycle so as to extend substantially in the vertical direction. More specifically, its axial line is slightly inclined rearwardly of the vehicle (slightly leftwardly in FIG. 3)

The master cylinder 2 for braking is composed of the master cylinder main body 6 and the sub-tank 7 for supplying working oil for braking. The master cylinder main body 6 and the sub-tank 7 can be integrally formed by casting.

The sub-tank 7 has an elongated shape, and is mounted on the rear side of the master cylinder main body 6 so that its major axis is substantially in parallel with the major axis of the master cylinder main body 6 (or in parallel to the major axis of the cylinder chamber 6a).

Figure 7:
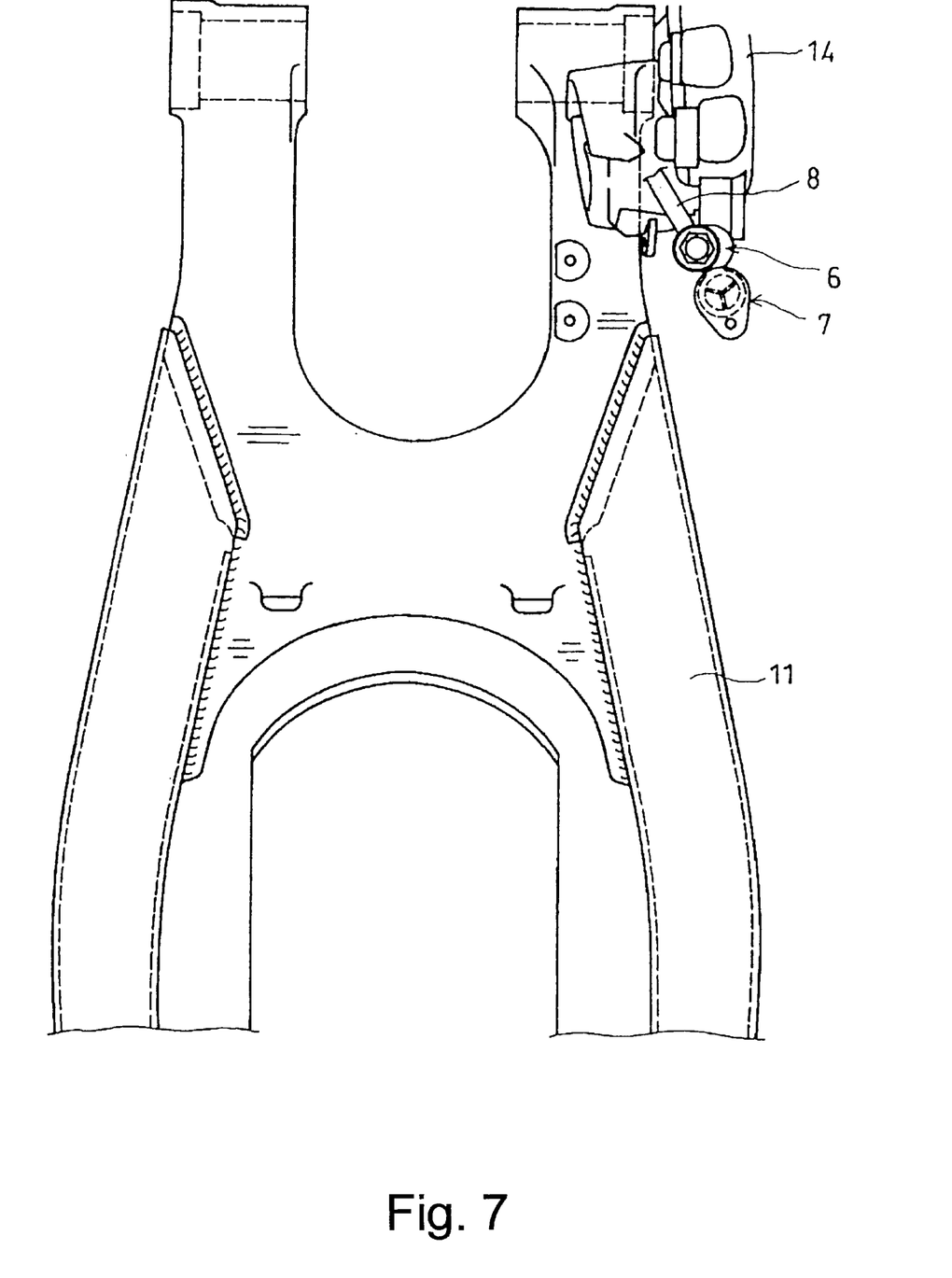
FIG. 7 is a plan view as seen from the direction A of FIG. 1 of the swing arm.

As shown in FIG. 7, the sub-tank 7 is disposed so that the major axis thereof is positioned outwardly from the major axis of the master cylinder main body 6 in the width direction of the vehicle body.

The inner side of the sub-tank 7 has a cylindrical shape, and the inside diameter of the sub-tank 7 is slightly larger than that of the cylinder chamber 6a. A working oil reservoir chamber 7a of the sub-tank 7 is phase-shifted from the cylinder chamber 6a in the axial direction.

A piston 9 is slidably fitted in the cylinder chamber 6a of the master cylinder main body 6. The piston 9 is moved forward and backward via the link mechanism 10 by an operating force applied from a driver to the brake pedal. When it is required to brake the vehicle, the piston 9 is operated to press working oil in the cylinder chamber 6a, thereby feeding the working oil to the caliper 5 via the brake hose 8 Reference numeral 32 designates a universal joint for connecting the outer end of the piston 9 to the terminal of the link mechanism 10.

A partition wall 23 is provided between the master cylinder main body 6 and the sub-tank 7. A lower portion of the partition wall 23, positioned on the lower side in FIG. 3, has a first port 24 and a second port 25 formed as throughholes. The first and second ports 24 and 25 are positioned close to each other and have parallel axial lines The first port 24 has a relatively large diameter, and the second port 25 has a portion having a very small diameter, so that the restricting effect of the second port 25 is larger than that of the first port 24.

The sub-tank 7 has a first opening 26 at a lower portion in the major axis direction, a second opening 27 at one end (upper end in this embodiment), and a third opening 35 positioned between the first and second openings 26 and 27.

The first opening 26 is located at the portion through which the axial line of the first port 24 and the axial line of the second port 25 pass. Accordingly, both the ports 24 and 25 can be formed by machining the partition wall 23 with a tool (not shown) inserted in the sub-tank 7 through the first opening 26. After the formation of both the ports 24 and 25 by machining the partition wall 23, the first opening 26 is blocked with a blind plug 28 The upper end of the sub-tank 7 extends upwardly from the head of the banjo-type bolt 21 which is located at the top of the mounting portion. The upper end of the sub-tank 7 has the second opening 27. When the residual amount of working oil for braking in the sub-tank 7 becomes small, working oil for braking is supplied in the sub-tank 7 through the opening 27.

The second opening 27 is usually liquid-tightly blocked by a lid 29 The lid 29 includes a bag-like diaphragm 29a, a pressing plate 36 covered on the lid 29, and a metal cap 30. The lid 29, the pressing plate 36, and the cap 30 are liquid-tightly fastened to the upper end wall of the sub-tank 7 by means of a threaded bolt 31. The lid can be made from a rubber, and the pressing plate can be made from a resin.

The diaphragm 29a is formed integrally with the lid 29 so as to be disposed in the working oil reservoir chamber 7a of the sub-tank 7. The diaphragm 29a is formed into an expandable/contractible bag.

Figure 5:
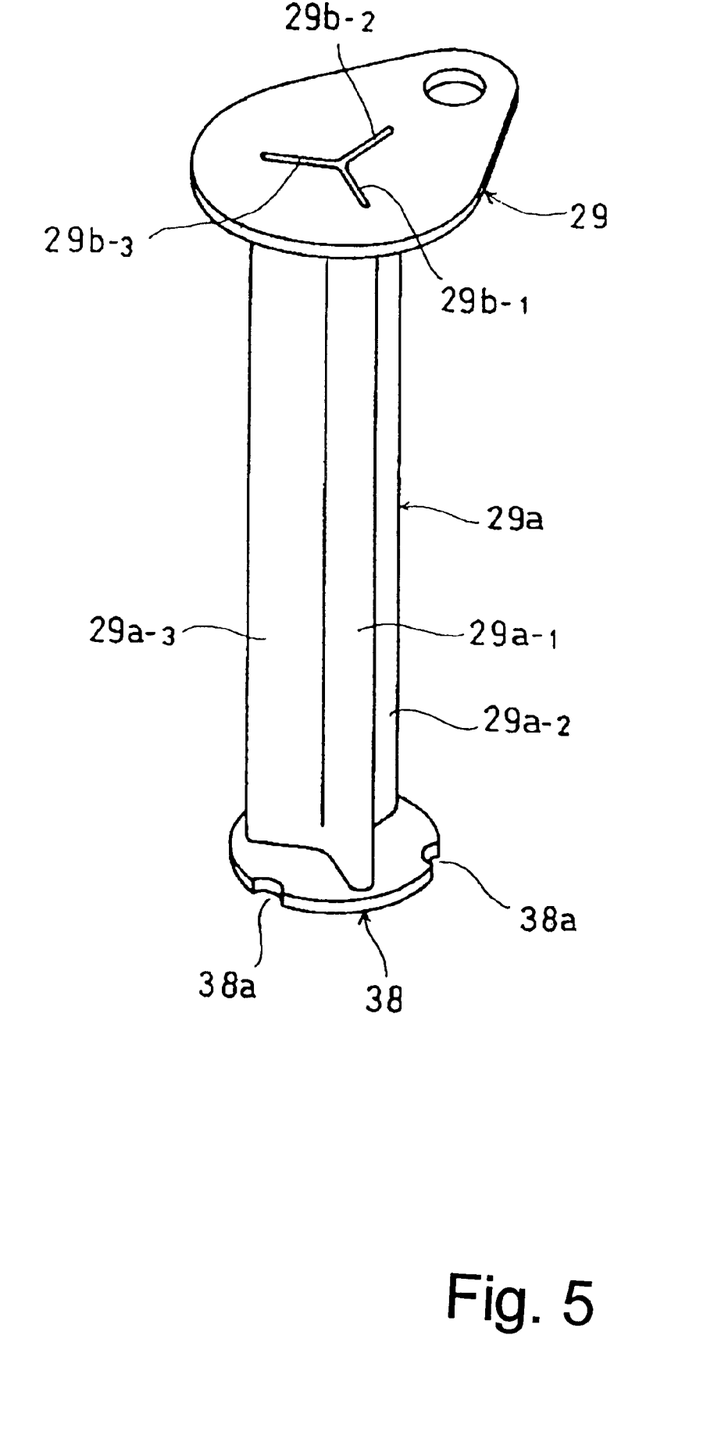
FIG. 5 is a perspective view of the oil separator.

As shown in FIG. 5, the diaphragm 29a is composed of bag single bodies 29a-1, 29a-2, and 29a-3 spaced from each other at intervals of 120°. In addition, each of the bag single bodies 29a-1, 29a-2 and 29a-3 is elongated in a band-shape. The upper ends of the bag single bodies 29a-1, 29a-2 and 29a-3 communicate with ambient via narrow grooves 29b-1, 29b-2, and 29b-3 The narrow grooves 29b-1, 29b-2, and 29b-3 are formed so as to pass through the lid 29 and are spaced from each other at intervals of 120° corresponding to the bag single bodies 29a-1, 29a-2 and 29a-3.

The lower end of the diaphragm 29a is fixed to an oil separator 38, so that the bag-like inner space of the diaphragm 29a is closed by the oil separator 38 The oil separator 38 is provided separately from the diaphragm 29a and is then fixed to the diaphragm 29a by using an adhesive or by thermal fusion. Alternatively, the oil separator 38 may be integrally formed on the diaphragm 29a. The oil separator 38 can be made from a resin.

The oil separator 38, which has a disk-shape, has a diameter substantially the same as that of the working oil reservoir chamber 7a of the sub-tank 7 The outer peripheral surface of the oil separator 38 has semi-circular small hole passages 38a equally spaced from each other in the circumferential direction.

When working oil at the lever higher than that of the oil separator 38 in the working oil reservoir chamber 7a intakes air and bubbles, the working oil flows through the small hole passages 38a. This separates bubbles from the working oil by the plate surface of the oil separator 38. As a result, the bubbles caused in the working oil do not enter the cylinder 6a of the master cylinder main body 6.

Figure 4:
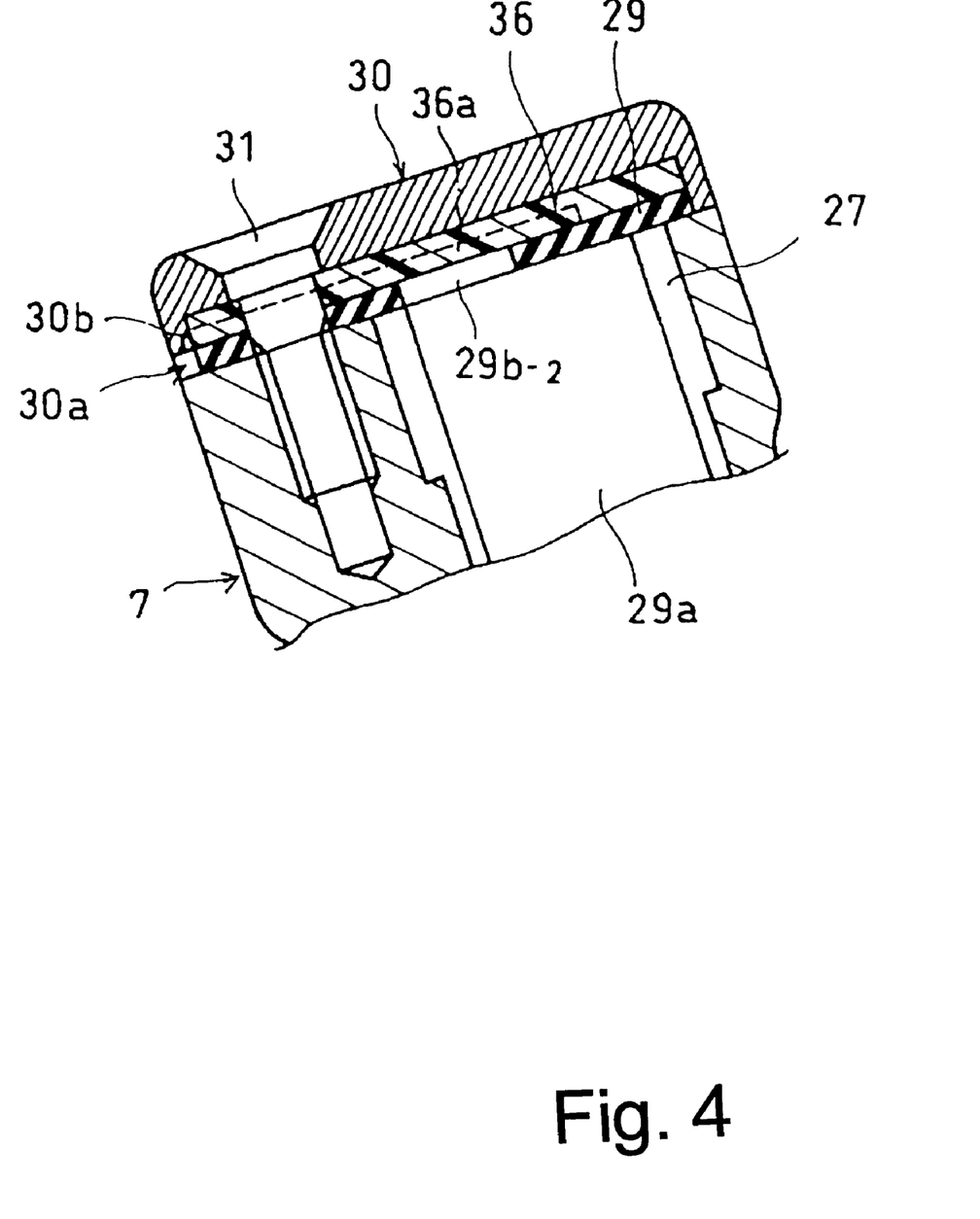
FIG. 4 is an enlarged view of the sub-tank.

FIGS. 4 and 5 will be referred to show the expansion and contraction of the diaphragm 29a. The bag single bodies 29a-1, 29a-2, and 29a-3 of the diaphragm 29a communicate with ambient via the narrow grooves 29b-1, 29b-2, and 29b-3 formed in the lid 29, by a passage 36a formed in the inner surface of the pressing plate 36a, and by a passage 30a formed in the peripheral wall of the cap 30.

While not shown in detail, the passage 36a formed in the inner surface of the pressing plate 36 is composed of a circular recess which commonly covers the narrow grooves 29b-1, 29b-2, and 29b-3, and a narrow groove for communicating the circular recess to the passage 30a.

While not shown in detail, the passage 30a formed in the peripheral wall of the cap 30 is composed of a portion having a U-shaped cross-section extending along the axial line of the cap 30, and a narrow groove portion 30b continuous with the bottom of the U-shaped portion. The narrow groove portion 30b is recessed in the inner peripheral wall by a specific length so as to extend in the peripheral direction.

When the piston 9 of the master cylinder main body 6 is moved forward or backward in the cylinder chamber 6a, and in response the working, oil flows between the cylinder 6a and the working oil reservoir chamber 7a of the sub-tank 7, the diaphragm 29a disposed in the working oil reservoir chamber 7a is contracted or expanded by the working oil or filling air in the working oil reservoir chamber 7a. At this time, since the air in the diaphragm 29a communicates with ambient via the narrow grooves 29b-1, 29b-2, and 29b-3, and passages 36a and 30a, it responds to the contracting or expanding action of the diaphragm 29a due to the working oil or filling air in the working oil reservoir chamber 7a.

The third opening 35 is covered with a lid 37. The lid 37 has a window through which the amount of the working oil for braking remaining in the sub-tank 7 can be checked.

The function of the disk type brake system 1 will now be described

A rider actuates a brake pedal to brake the vehicle At this time, the piston 9 is moved forward in the cylinder chamber 6a via the rear brake lever 10, to press the working oil in the cylinder chamber 6a. Most of the working oil thus pressed is fed to the caliper 5 via the brake hose 8. Most of the working oil thus pressed is fed to the caliper 5 via the brake hose 8, and the remaining working oil is pressed back in the working oil reservoir chamber 7a of the sub-tank 7 via the first port 24 and the second port 25.

At the same time, part of the working oil is pressed back in the working oil reservoir chamber 7a of the sub-tank 7 via the second port 25. However, the working oil thus pressed back is absorbed by contraction of the diaphragm 29a in the working oil reservoir chamber 7a, and also absorbed by flow of the working oil in an oil chamber 6b behind a large-diameter head of the piston 9 via the first port 24.

In this way, the pressing action due to the working oil in the cylinder 6a by the piston 9 is damped As a result, the initial braking action of the disk type brake system 1, which is caused when both the side surfaces of the brake disk 4 are clamped by the pair of friction pads in the caliper 5, is moderated.

When the piston 9 is further moved forward in the cylinder chamber 6a until the first port 24 is blocked by the piston 9, the pressing action due to the working oil in the cylinder chamber 6a by the piston 9 becomes larger. A part of the working oil is pressed back yet in the working oil reservoir chamber 7a of the sub-tank 7 via the second port 25. As a result, the pressing action due to the working oil is absorbed by contraction of the diaphragm 29a, and moderates the initial braking action of the disk type brake system 1.

When the piston 9 is further moved forward in the cylinder chamber 6a until the second port 25 is blocked by the piston 9, the pressing action of the working oil in the cylinder chamber 6a by the piston 9 is increased to the maximum value, and the working oil thus pressed is all fed to the caliper 5 via the brake hose 8.

The master cylinder for braking according to this embodiment has the following advantages:

In the master cylinder 2 for braking in which the sub-tank 7 for supplying working oil for braking is integrally provided on the master cylinder main body 6, the sub-tank 7 formed into the elongated shape is disposed so that its major axis is substantially parallel to the major axis of the master cylinder main body 6. The master cylinder 2 therefore has an elongated shape as a whole, and does not extend largely in the width direction. This simplifies the structure of the master cylinder and saves space in the brake system.

The mounting seat 33 for mounting the brake hose 8 extends perpendicularly to the major axis of the master cylinder main body 6, and the mounting portion of the brake hose 8 is fastened to the mounting seat 33. One end portion of the sub-tank 7 extends upwardly from the mounting portion of the brake hose 8, and has a second opening 27 as a port through which working oil for braking is supplied. The structure of the connecting portion of the brake hose 8 to the master cylinder main body 6 is therefore reduced in size and simplified The mounting portion (eye fixture 20 and banjo-type bolt 21), on the master cylinder main body 6 side, of the brake hose 8 does not obstruct maintenance work.

The inner side of the sub-tank 7 is formed into a cylindrical shape, and the bag-like diaphragm 29a and the oil separator 38 having a plurality of the small hole passages 38a are disposed in the sub-tank 7. The inside of the diaphragm 29a is communicates with ambient, and thereby the diaphragm 29a can be expanded/contracted As a result, upon initial braking operation of the disk type brake system 1, part of the working oil is pressed back in the sub-tank 7. The pressing action due to the working oil pressed back is absorbed by contraction of the diaphragm 29a, so that the initial braking operation of the brake system 1 is moderated.

During running of the vehicle, the working oil in the sub-tank 7 intakes air due to vibration and bubbles. The bubbles entrapped in the working oil are separated from and blocked by the oil separator 38. As a result, the bubbles in the working oil do not enter in the cylinder chamber 6a of the master cylinder 6, which improves the reliability of the master cylinder 2.

Since the oil separator 38 is integrally provided on the diaphragm 29a, it is possible to easily mount the oil separator 38 and to reduce the number of parts.

In the motorcycle on which the master cylinder 2 for braking in this embodiment is mounted, the master cylinder 2 is disposed on one side of the vehicle body so that the major axis direction of the master cylinder main body 6 is directed substantially in the vertical direction of the vehicle body Because the master cylinder 2 is disposed on the side of the vehicle body so that the entire elongated shape is directed substantially in the vertical direction of the vehicle body, the length of the vehicle body can be reduced, so that even if an external force is applied to the master cylinder 2 due to upsetting or the like, the moment applied to the mounting portion of the master cylinder 2 can be reduced. This reduces the weight of the stays 12 and 13 etc. at the mounting portion of the master cylinder 2.

In the motorcycle on which the master cylinder 2 for braking in this embodiment is mounted, the master cylinder 2 is configured such that the major axis of the sub-tank 7 is positioned outwardly (with respect to the vehicle body) from the major axis of the master cylinder main body 6. As a result, if the master cylinder 2 is used to operate the rear brake, the width of the swing arm 11 can be made wider toward the rear side of the vehicle body, so that a wide tire can be mounted without widening the pivot width.

Figure 6:
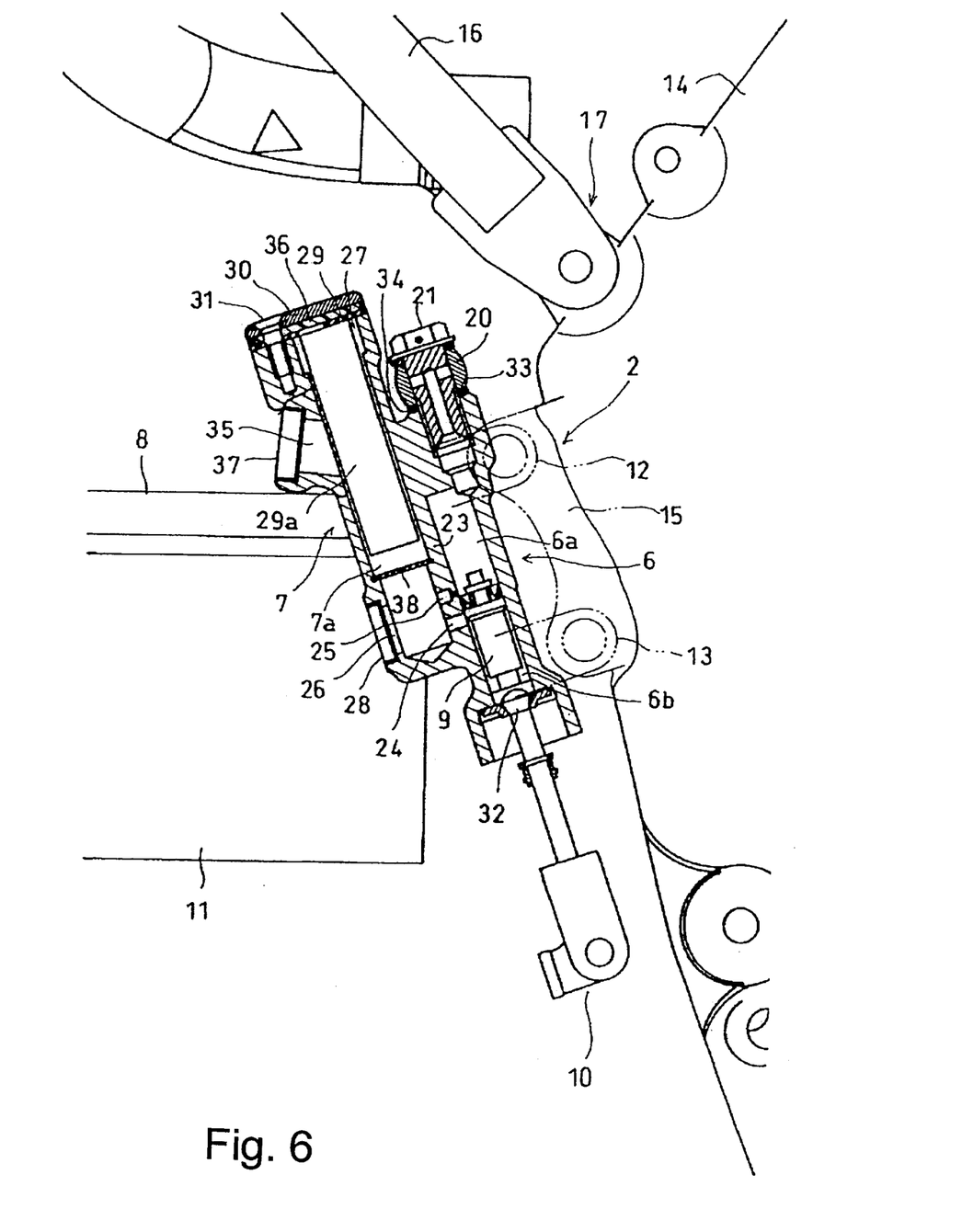
FIG. 6 is a sectional view of a variant of the oil separator.

In this embodiment, the oil separator 38 is integrally provided on the diaphragm 29a. However, the present invention is not limited thereto FIG. 6 shows a variant of the present invention in which the oil separator 38 is provided separately from the diaphragm 29a.

In this case, the cylindrical shape of the working oil reservoir chamber 7a of the sub-tank 7 is modified into a stepped cylindrical shape having a large-diameter portion and a small-diameter portion. The oil separator 38 is fitted around the stepped portion of the cylindrical shape of the working oil reservoir chamber 7a of the sub-tank 7 In addition, the lower ends of the bag-single bodies 29a-1, 29a-2 and 29a-3 of the diaphragm 29 are sealed by thermal fusion.

In this embodiment, the disk type brake system 1 to which the master cylinder 2 is applied is mounted to the rear wheel side of the motorcycle. However, it may be mounted on the front wheel side.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A combination comprising:
a master cylinder including:
- a main body having a major axis, the main body including a chamber for receiving a piston;
- a sub-tank integrally connected to the main body, the sub-tank having an elongated shape and a major axis oriented substantially parallel to the major axis of the main body, wherein the sub-tank is connected to the main body to supply working oil to the main body for braking;
- an interior of the sub-tank is cylindrical;
- a diaphragm is disposed in said sub-tank;
- an oil separator having a plurality of passages is disposed in said sub-tank, wherein the oil separator is integral with the diaphragm; and
- an interior of the diaphragm communicates with ambient air.

2. The combination of claim 1, wherein the main body and the sub-tank are formed as a single casting, a partition wall of the master cylinder extending between the sub-tank and the main body, and at least one port providing fluid communication between the main body and the sub-tank.

3. The combination of claim 1, further comprising a mounting seat for mounting a brake hose disposed at one end the main body, the mounting seat extending perpendicularly to the major axis of the cylinder main body.

4. The combination of claim 3, wherein one end of the sub-tank extends upwardly from said mounting seat, and has a port for supplying working oil for braking.

5. The combination of claim 3, wherein the mounting seat is radially offset from the major axis of the main cylinder.

6. The combination of claim 1, wherein the diaphragm includes three elongated bodies spaced at 120 degree integrals, the oil separator being integral with the diaphragm at one end of the elongated bodies, and a lid being disposed at an opposite end of the elongated bodies.

7. The combination of claim 1, wherein the sub-tank includes:
- a first opening providing fluid communication with the main body; and
- a second opening disposed at one end of the sub-tank for receiving working oil into the sub-tank.

8. The combination according to claim 1, further comprising:
- a vehicle body; and wherein
  - said brake master cylinder is disposed on a side of the vehicle body so that the major axis of said main body extends substantially vertically.

9. The combination according to claim 8, wherein the master cylinder is disposed so that the major axis of said sub-tank is positioned outwardly from the vehicle body relative to the major axis of the main body.

10. The combination according to claim 8, further comprising:
- a rear brake having a caliper;
- a mounting seat for mounting a brake hose disposed at one end of the main body, the mounting seat extending perpendicularly to the major axis of the cylinder main body; and
- a brake hose extending between the rear brake and the mounting seat.

11. The combination according to claim 8, wherein the vehicle body includes a pivot plate connected to a lower rear frame, the master cylinder being connected to the pivot plate by stays.

* * * * *